(12) United States Patent
Karaoguz et al.

(10) Patent No.: US 8,862,766 B2
(45) Date of Patent: Oct. 14, 2014

(54) CUSTOMIZED DATA DELIVERY AND NETWORK CONFIGURATION VIA AGGREGATION OF DEVICE ATTRIBUTES

(75) Inventors: Jeyhan Karaoguz, Irvine, CA (US); Bruce Currivan, Dove Canyon, CA (US); Wael William Diab, San Francisco, CA (US); Yongbum Kim, San Jose, CA (US); Kenneth Ma, Cupertino, CA (US); Michael Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 830 days.

(21) Appl. No.: 12/616,607

(22) Filed: Nov. 11, 2009

(65) Prior Publication Data

US 2011/0022733 A1 Jan. 27, 2011

Related U.S. Application Data

(60) Provisional application No. 61/228,385, filed on Jul. 24, 2009.

(51) Int. Cl.
*G06F 15/16* (2006.01)
(52) U.S. Cl.
USPC .......................... 709/232; 709/236; 709/247
(58) Field of Classification Search
USPC .................. 709/247, 236, 232, 206
See application file for complete search history.

(56) References Cited

U.S. PATENT DOCUMENTS

| | | | |
|---|---|---|---|
| 5,519,438 A * | 5/1996 | Elliott et al. | 348/180 |
| 7,590,750 B2 * | 9/2009 | Adbo et al. | 709/231 |
| 2004/0139233 A1 * | 7/2004 | Kellerman et al. | 709/246 |
| 2005/0231641 A1 * | 10/2005 | Suito | 348/555 |
| 2006/0218480 A1 * | 9/2006 | Moggert et al. | 715/500 |
| 2006/0224525 A1 | 10/2006 | Dahlin et al. | 705/80 |
| 2006/0230309 A1 * | 10/2006 | Kromer et al. | 714/11 |
| 2007/0109935 A1 * | 5/2007 | Park et al. | 369/53.2 |
| 2007/0192486 A1 | 8/2007 | Wilson et al. | 709/225 |
| 2008/0208607 A1 * | 8/2008 | Ma et al. | 705/1 |

OTHER PUBLICATIONS

European Search Report for European Patent Application No. 10007331.1-1244, issued Oct. 24, 2011, 3 pages.

* cited by examiner

*Primary Examiner* — Thu Nguyen
*Assistant Examiner* — Ebrahim Golabbakhsh
(74) *Attorney, Agent, or Firm* — Brinks Gilson & Lione (57) ABSTRACT

Aspects of a method and system for customized data delivery and network configuration via aggregation of device attributes are provided. In this regard, a first network device may receive device attributes from a plurality of devices that are communicatively coupled to the first network device. The first network device may aggregate the received device attributes and communicate the aggregate attributes to a source network device. The first network device may receive customized content from the source network device, wherein the customization is based on the aggregate device attributes. The first network device may communicate the customized content to the plurality of devices. The first network device may comprise, for example, a set-top box, a wired access point, and/or wireless access point. The device attributes of a device may comprise settings, capabilities, and/or user preferences of the device.

20 Claims, 5 Drawing Sheets

CUSTOMIZED DATA DELIVERY AND NETWORK CONFIGURATION VIA AGGREGATION OF DEVICE ATTRIBUTES

CROSS-REFERENCE TO RELATED APPLICATIONS/INCORPORATION BY REFERENCE

This patent application makes reference to, claims priority to and claims benefit from U.S. Provisional Patent Application Ser. No. 61/228,385 filed on Jul. 24, 2009.

The above stated application is hereby incorporated herein by reference in its entirety.

FIELD OF THE INVENTION

Certain embodiments of the invention relate to networking. More specifically, certain embodiments of the invention relate to a method and system for customized data delivery and network configuration via aggregation of device attributes.

BACKGROUND OF THE INVENTION

Electronic communication networks are becoming an increasingly popular means of exchanging data of various types, sizes for a variety of applications and business and consumers alike want network access on more and more devices. Moreover, consumers and business continually want faster network access and/or greater bandwidth on all of their communication devices. Consequently, as more and more devices are being equipped to access communication networks, network administrators and service providers are presented with the challenge of effectively serving an increasing number of devices having and increasingly diverse set of capabilities utilizing an increasing diverse collection of protocols, software, and/or other networking and computing resources.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for customized data delivery and network configuration via aggregation of device attributes, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for customized data delivery and network configuration via aggregation of device attributes. In various embodiments of the invention, first network device may receive device attributes from a plurality of devices that are communicatively coupled to the first network device. The first network device may aggregate the device attributes and communicate the aggregate device attributes to a source network device. The first network device may receive customized from the source network device, wherein the customization is based on the aggregate device attributes. The first network device may communicate the customized content to the plurality of devices. The first network device may comprise one or more of a set-top box, a wired access point, and/or wireless access point. The device attributes of each of the plurality of network devices may comprise settings, capabilities, and/or user preferences. Additionally or alternatively, the device attributes of each of the plurality of network devices may comprise one or more of: a serial number or unique identifier, a manufacturer identifier, a model identifier, a hardware configuration, a software configuration, an operating system identifier, available and/or total memory, available and/or total processing cycles, security information, battery level, and/or power settings.

The communication of the aggregate device attributes may be secured utilizing IPSec and/or MACsec protocols. The device attributes may be received by the first network device via an out-of-band channel. The device attributes may be received by the first network device via an optical communication link. The content may be customized by one or more of: compressing, decompressing, down-sampling, and/or up-sampling. The customized content may be delivered from the first network device to the plurality of devices based on the aggregate device attributes. The first network device may be configured based on the aggregate device attributes. The source network device may be configured based on the aggregate device attributes. One or more network devices along a network path between the first network device and the source network device may be configured based on the aggregate device attributes.

Figure 1:
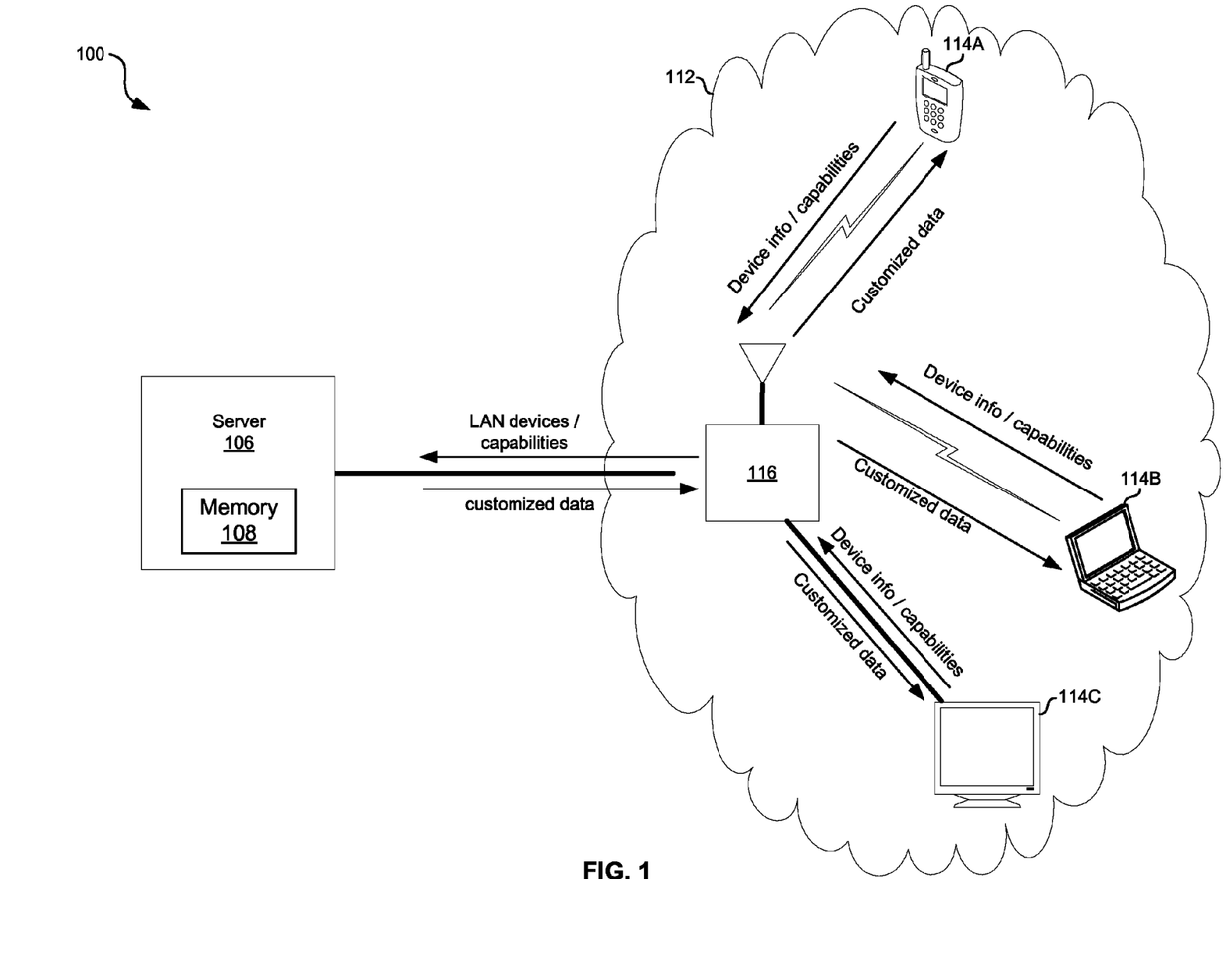
FIG. 1 is a diagram illustrating customized data delivery based on aggregated device attributes, in accordance with an embodiment of the invention.

FIG. 1 is a diagram illustrating customized data delivery based on aggregated device attributes, in accordance with an embodiment of the invention. Referring to FIG. 1, there is shown a network 100 comprising a server 106 and a subnetwork 112. The subnetwork 112 may be, for example, a local area network (LAN) and may comprise network devices 114a, 114b, and 114 (collectively or individually referenced herein as network devices 114) and 116.

The server 106 may comprise suitable logic, circuitry, interfaces, and/or code that may be operable to provide services and/or applications to one or more remote device(s) and to customize the services and/or applications provided to one or more remote device(s) based on attributes of the one or more remote device(s). Exemplary services and/or applications provided by the server 106 may comprise web hosting, general purpose file hosting and/or storage, multimedia streaming, e-mail, online gaming, and VoIP. Additionally, the server 106 may comprise a memory 108 that may be operable to store device attributes for network devices that communicate with the server 206.

The network devices 114 may comprise various devices such as home entertainment equipment, computing devices, and portable devices. Exemplary entertainment equipment may comprise set-top boxes, optical drives, digital video recorders, televisions, and/or stereo systems. Exemplary computing devices may comprise desktop computers, laptop computers, and servers. Exemplary portable devices may comprise cell phones, smartphones, laptop computers, and/or portable media players.

Each of the network devices 114 may comprise suitable logic, circuitry, interfaces and/or code that may be operable to process electronic information and communicate with the network device 116. For example, each of the network devices 114 may be operable to send requests for data and/or content, receive, process, and present content, and/or to run a web browser or other applications for providing network services and/or applications to a user. Additionally, as part of communicating with the network device 116, each of the network devices 114 may be operable to communicate its attributes to the network device 116. In various embodiments of the invention, attributes of the devices 114a, 114b, and 114c may be associated with or indicated by a user profile of the cellular enabled communication devices 114a, 114b, and 114c, respectively.

The network device 116 may be an access point device which may comprise, for example, a router, a server, a wired access point, a wireless access point, or a set-top box. The network device 116 may comprise suitable logic, circuitry, interfaces, and/or code that may be operable to communicate with the network devices 114 and with the server 116. In communicating with the network devices 114, the network device 116 may receive device attributes from one or more of the network devices 114 and communicate the aggregate device attributes from the network devices 114 to the server 106.

Protocols and/or network links utilized for communication between the network devices 114 and the network device 116 may vary from device to device and may comprise wired, wireless, and/or optical links. Exemplary protocols which may be utilized for communication between the network devices 114 and the network device 116 may comprise Ethernet, Wi-Fi, Bluetooth, Zigbee, USB, IEEE 1394, HDMI, and DisplayPort.

Protocols and/or network links utilized for communication between the network device 116 and the server 106 may comprise wired, wireless, and/or optical links. Exemplary protocols which may be utilized for communication between the network device 116 and the server 106 may comprise Ethernet, Wi-Fi, Bluetooth, Zigbee, USB, IEEE 1394, HDMI, and DisplayPort. Additionally, in some embodiments of the invention, the server 106 may be part of a service provider network and the server 106 may communicate with the network device 116 via a DSL or cable television head-end (not shown). In such embodiments of the invention, the network device 116 may comprise a DSL or CATV modem.

In operation, device attributes may be communicated from each of the network devices 114 to the network device 116. The network device 116 may generate one or more messages comprising the aggregate of the device attributes received from the network devices 114 and may communicate the message(s) to the server 106. In this regard, device attributes from a plurality of network devices 114 may be consolidated for communication to the server 206. In some instances, device attributes for the network device 116 may additionally be communicated with the attributes associated with the network devices 114. In addition to consolidating and forwarding the device attributes, the network device 116 may store the attributes in a table or other data structure. Furthermore, in various embodiments of the invention, the network device 116 may be configured based on attributes of the devices 114. That is, in addition to aggregating the attributes, the network device 116 may inspect or determine the attributes and may be configured based on the attributes. Also, in instances that there are additional network devices along the path from the network device 116 to the server 106, one or more of those devices may also be configured based on the communicated aggregate attributes. In some embodiments of the invention, the message(s) may be encrypted and/or otherwise secured for communication to the server 206.

A device's attributes may comprise, for example, its capabilities, preferences, and/or settings. A device's attributes may comprise, for example, one or more of its: serial number or unique identifier, make, model, hardware configuration, software configuration, operating system, available and/or total memory, available and/or total processing cycles or capabilities, security information and/or settings, battery strength, power settings, and user preferences.

In some embodiments of the invention, the device attributes from the devices 114 may be communicated to the network device 116 in-band with content delivered from the network device 116. For example, the network device 114c may be communicatively coupled to the network device 116 via a bi-directional link utilizing a protocol such as Ethernet, and thus content may be communicated to the device 114c via a downlink channel and device attributes may be communicated to the device 116 via an upstream channel.

In some embodiments of the invention, the device attributes from the devices 114 may be communicated to the network device 116 out-of-band with content delivered from the network device 116. For example, the network devices 114a may communicate its device attributes to the network device 116 via Bluetooth and the network device 116 may communicate content to the network devices 114a via an HDMI connection. Notwithstanding, some of the device attributes may be communicated in-band while some of the device attributes may be communicated out-of-band (OOB).

The server 106 may receive the aggregate device attributes and may store the attributes to a database or other data structure. The device attributes may then be utilized to determine services and/or applications to make available to the subnetwork 112. Additionally or alternatively, the device attributes may be utilized to determine how to format, encode, or otherwise process content such that the content may be suitable for conveyance to the devices 114 via the device 116. For example, device attributes associated with the network device 114a may indicate that it is suited for low resolution video and thus the server 106 may transcode higher resolution video to a lower resolution prior to transmitting the video destined for the device 114a. For another example, the device attributes may indicate coding and/or decoding hardware and/or software utilized by a device 114 and the server 106 may encode content accordingly.

In an exemplary embodiment of the invention, the networking devices 114 may each request, for example, a multimedia stream from the server 106 but each of the network devices 114, as indicated by the received device attributes, may have different multimedia processing capabilities. Accordingly, the server 106 may be operable to generate a scalable coded datastream comprising a plurality of subset datastreams. In this regard, a subset datastream may be generated by dropping portions of a datastream. For example, packets may be dropped from an MPEG datastream to generate a subset datastream. The subset datastream may have lower temporal resolution, spatial resolution, and/or quality compared to the original MPEG datastream. Which of the plurality of subset datastreams are delivered to each of the devices 114a, 114b, and 114c may be determined based on the device attributes associated with network device 114a, 114b, and 114c, respectively. In some embodiments of the invention, the network device 116 may further process data for delivery to one or more of the network devices 114.

In another exemplary embodiment of the invention, it may be determined that one or more attributes are common among two or more of the devices 114. Consequently, the content to be delivered to the subnetwork 112 may be customized based on the shared attributes. Additionally, the server 106, the network device 116, and/or any other network devices along the path between the server 106 and the network device 116, may be configured based on the shared attributes. That is to say, if the network devices 114 have widely differing attributes, it may be difficult to optimize the content and/or network path for delivery of content to the devices. However, when the devices 114 share attributes, it may be possible to customize the data and/or the network configuration to optimize delivery of content based on the shared attributes.

Although a single server 206 is utilized for illustrative purposes in FIG. 1, one or more other network devices may receive the aggregate device attributes and utilized it to manage the delivery of content to the devices 114.

Figure 2:
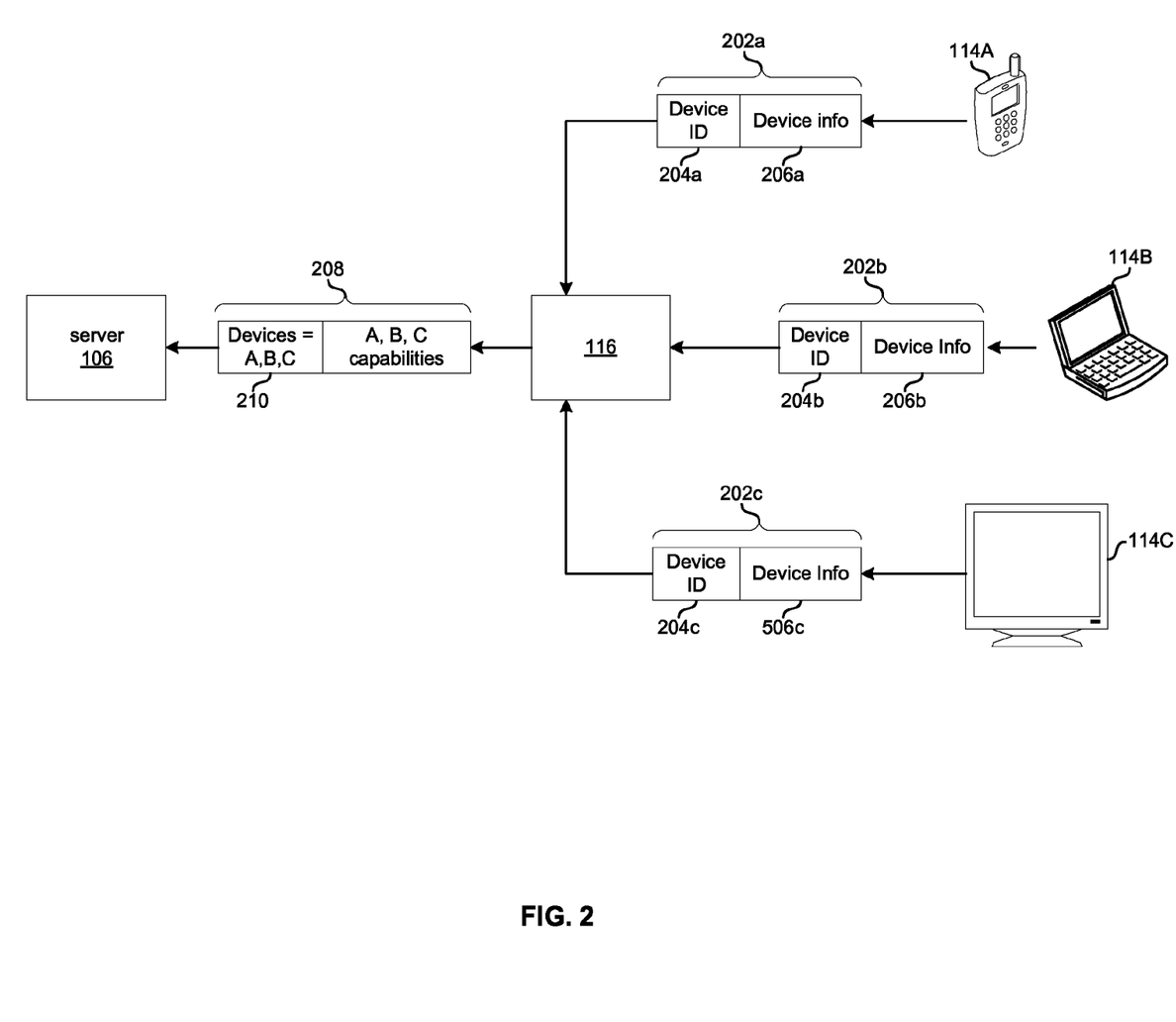
FIG. 2 is a diagram illustrating aggregation and communication of device attributes, in accordance with an embodiment of the invention.

FIG. 2 is a diagram illustrating aggregation and communication of device attributes, in accordance with an embodiment of the invention. Referring to FIG. 2, there is shown the network devices 114 and the network device 116 described with respect to FIG. 1. Also shown in FIG. 2 are exemplary messages 202 and 208 for exchanging device attributes.

Each of the messages 202a may comprise a field 204 identifying a device associated with the message 202 and a field 206 comprising other device attributes. The field 204 may comprise, for example, a serial number or other information identifying the specific device 114, and/or may comprise make, model, or other information that generally identifies the device 114. In this regard, the general information may identify, for example, a category or class of devices to which the device 114 belongs. The field 206 may comprise, for example, hardware configuration, software configuration, power settings, operating system, and/or other attributes of the device, or device class/category, identified by the corresponding field 204. The messages 202a may be exchanged utilizing a dedicated protocol, or may be encapsulated in packets utilized natively on the link over which they are communicated. For example, the messages 202 may be inserted in the payload of Ethernet packets. In another example, the attributes may be conveyed in a header or a reserved field of a packet.

The message 208 may comprise fields 210 and 212. The field 210 may identify the network devices 114 which provided device attributes to the network device 116. The field 210 may comprise, for example, a serial number or other information identifying the specific devices 114, and/or may comprise make, model, or other information that generally identifies the devices 114. In this regard, the general information may identify, for example, a category or class of devices to which the devices 114 belong. The field 212 may comprise, for example, hardware configuration, software configuration, power settings, operating system, and/or other attributes of the device, or device class/category, identified by the corresponding field 210.

In operation, the network devices 114a, 114b, and 114c may send the messages 202a, 202b, and 202c, respectively, to the network device 116. The network device 116 may extract the device attributes from the messages 202 and generate a message 208 comprising the attributes extracted from the messages 202. In various embodiments of the invention, the message 208 may be secured, encoded, scrambled or otherwise processed such that only a designated destination device can decipher the contents of the message. In regards to security the message 208 may be encrypted, scrambled, and/or securely communicated utilizing protocols such as MACSec and IPSec.

The server 206 may receive the message 208 and extract the identification information and/or the other device attributes associated with the network devices 114. The device attributes may then be stored in a database or other data structure. The attributes stored in the data structure may be utilized to determine which services and/or content to send or make available to a particular network and/or network device. The attributes stored in the data structure may be utilized to configure the server 106, the network device 116, and/or other network devices along a path from server 106 to the network devices 114. Additionally or alternatively, in instances when there is content to be transmitted to a particular network device 114, the server 106 may check the database to determine how to format, encode, secure, or otherwise process the content prior to transmitting the content.

Figure 3:
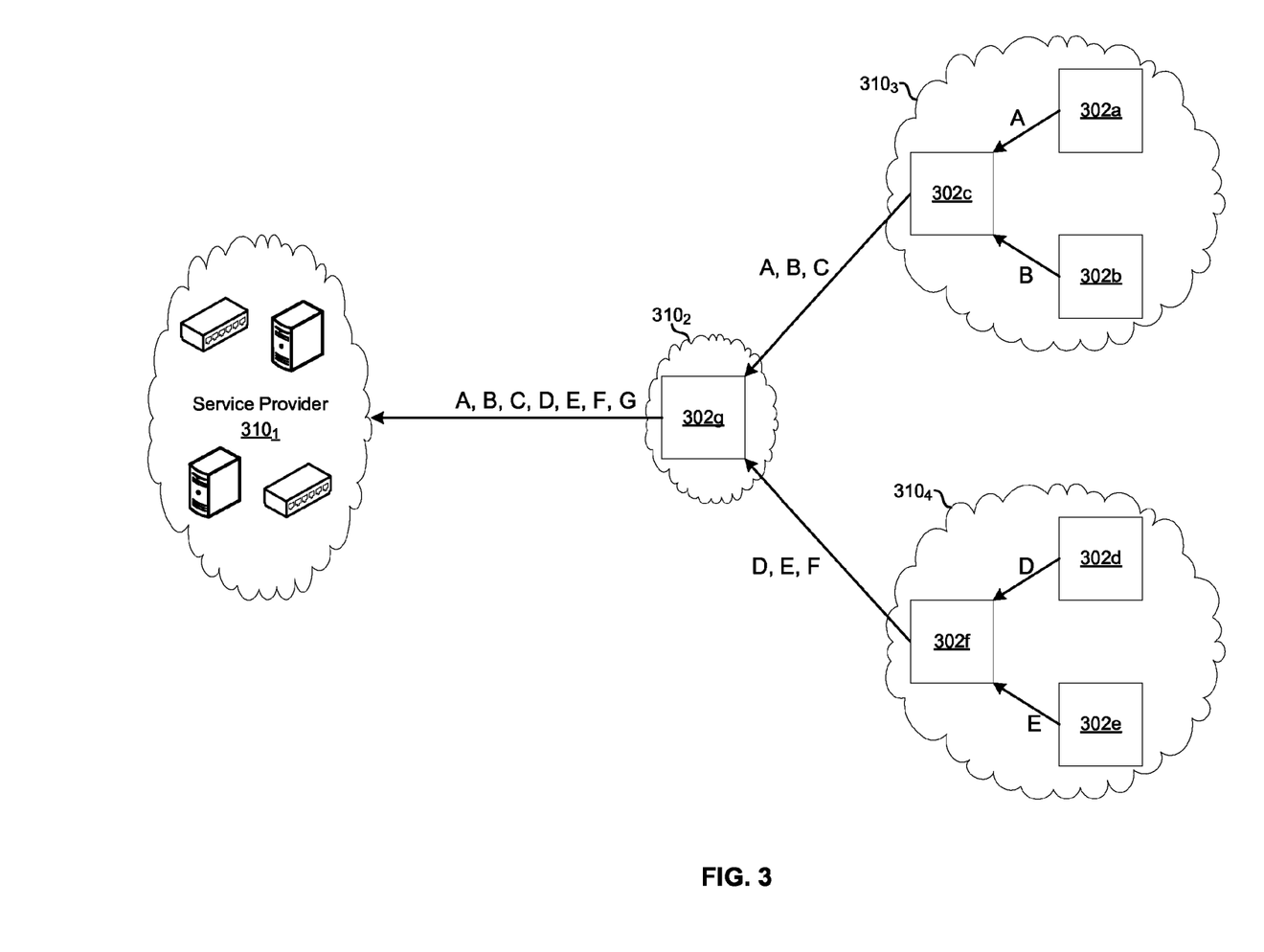
FIG. 3 is a diagram illustrating multiple levels of aggregation of device attributes, in accordance with an embodiment of the invention.

The embodiment in FIG. 2 is merely an example for illustration and is not exhaustive. For example, in other embodiments of the invention, device attributes may be communicate in a single field or in more than two fields. Similarly, device attributes may be transmitted in multiple messages. For example, the devices 114 may not communicate any identification field and thus the attributes of the devices may be limited FIG. 3 is a diagram illustrating multiple levels of aggregation of device attributes, in accordance with an embodiment of the invention. Referring to FIG. 3, there is shown networks $310_1$, $310_2$, $310_3$, and $310_3$.

Each of the networks $310_2$, $310_3$, and $310_3$ may comprise one or more network devices such as the network devices 14 and/or the network device 116 described with respect to FIGS. 1 and 2. In this regard, the network devices 302 may be similar to or the same as the network devices 114 and/or 116 described with respect to FIGS. 1 and 2. The service provider $310_1$ may comprise one or more network devices such as the server 106, head-ends, or other network devices operable to provide internet connectivity and/or content to network devices 302.

In operation, the network device 302a may communicate its device attributes, A, to the network device 302c and the network device 302b may communicate its device attributes, B, to the network device 302c. The network device 302c may comprise an access point device. The network device 302c may generate a message comprising the attributes 'A', the attributes B, and its own device attributes, C. In some embodiments of the invention, the device 302b may also store the attributes B and C locally. In some embodiments of the invention, the device 302b may be configured based on the attributes B and C. The network device 302c may encrypt or otherwise process the message for communication to the network device 302g and then send the attributes to the network device 302g, which may comprise an access point device. In some embodiments of the invention, the network device 302g may store a copy of the attributes A, B, and C locally.

Similarly, the network device 302d may communicate its device attributes, D, to the network device 302f and the network device 302e may communicate its device attributes, E, to the network device 302f. The network device 302f may comprise an access point device. The network device 302f may generate a message comprising the attributes D, the attributes E, and its own device attributes, depicted as F. In some embodiments of the invention, the device 302b may also store the attributes D and E locally. In some embodiments of the invention, the device 302f may be configured based on the attributes D and E. The network device 302f may encrypt or otherwise process the message for communication to the network device 302g and then send the attributes to the network device 302g.

The network device 302g may process the received messages to extract the attributes A, B, C, D, E, F and may generate a message comprising A, B, C, D, E, F, and its own device attributes G. The generated message may be formatted, encoded, and/or secured for communication to one or more devices in the service provider $310_1$ and may be communicated to the network $310_1$. Exemplary formatting and/or encoding of content may comprise, for example, up-sampling, down-sampling, scrambling, unscrambling, compressing, decompressing, and/or transcoding. In some embodiments of the invention, the device 302g may also store the attributes A, B, C, D, E, F locally. In some embodiments of the invention, the device 302g may be configured based on the attributes A, B, C, D, E, and F.

Subsequent to aggregation of the device attributes, one or more of the service provider $310_1$, the device 302g, the device 302c, and the devices 302f may utilize the aggregated attributes to customize delivery of data to the other devices 302. For example, the format, resolution, compression, encoding, and/or other characteristics of a multimedia stream transmitted by the service provider $310_1$, the device 302g, the device 302c, and/or the devices 302f may be formatted based on the aggregated attributes.

Figure 4:
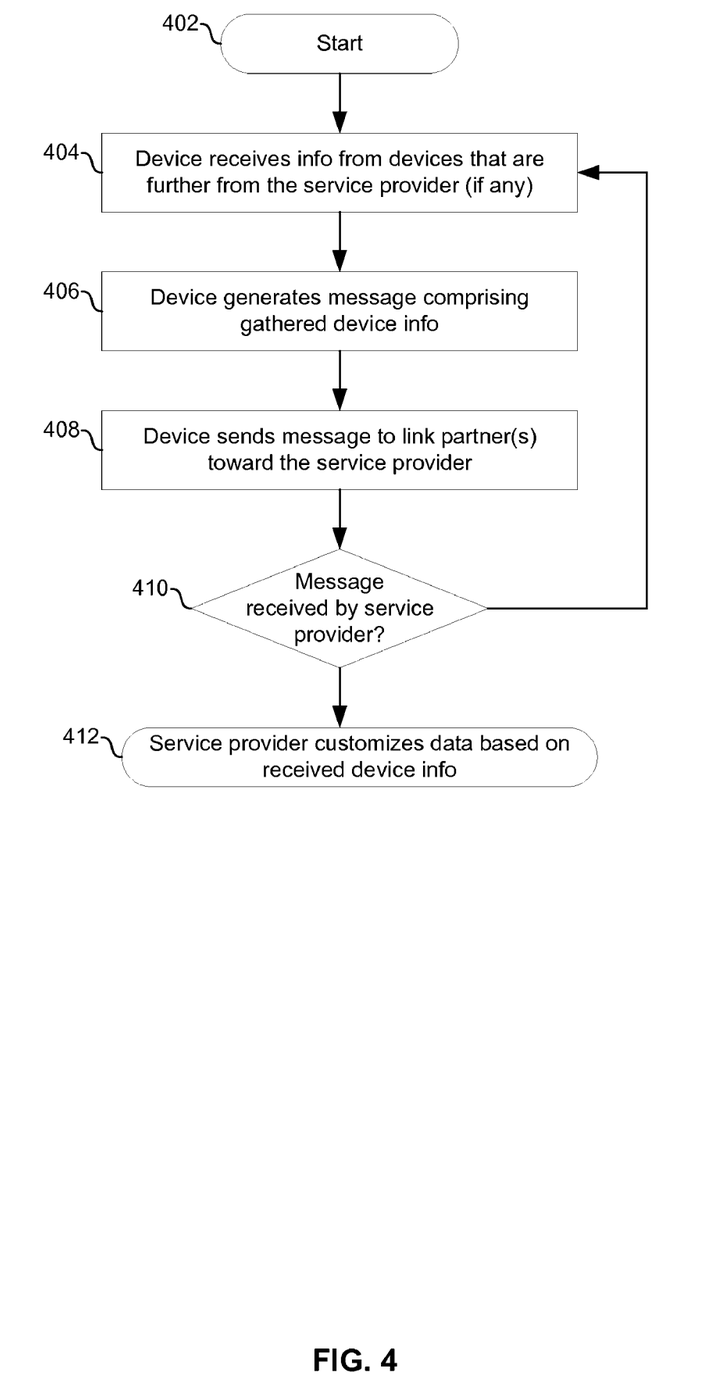
FIG. 4 is a flow chart illustrating exemplary steps for aggregating and communicating device attributes, in accordance with an embodiment of the invention.

FIG. 4 is a flow chart illustrating exemplary steps for aggregating and communicating device attributes, in accordance with an embodiment of the invention. Referring to FIG. 4, subsequent to step 404, the exemplary steps may advance to step 404. In step 404, a first network device may receive device attributes one or more second devices, if any, that are further, in terms of number of network hops, from a service provider than the first network device. The service provider may comprise, for example, the server 106 and/or other devices such as the network 114 and/or 116. Subsequent to step 404, the exemplary steps may advance to step 406.

In step 406, the first network device may generate a message comprising the received device attributes as well as its own device attributes. The message may be encoded, encrypted, and/or otherwise processed for communication. Additionally, in some embodiments of the invention, the first network device may be configured based on the received device attributes. Subsequent to step 406, the exemplary steps may advance to step 408.

In step 408, the message generated in step 406 may be communicated to one or more third network devices, where the third network device(s) either reside in the service provider or are closer, in terms of number of network hops, to the service provider. In this regard, the message may be communicated securely utilizing, for example, IPSec or MACsec. Subsequent to step 408, the exemplary steps may advance to step 410.

In step 410, in instances that the third network devices do not reside within the domain of the service provider's $310_1$—the ultimate destination of the device attributes—then the exemplary steps may return to step 404. In instances that the third network device(s) do reside in the domain of the service provider $310_1$ the exemplary steps may advance to step 412.

In step 412, the one or more third network devices within the domain of the service provider $310_1$ may decode, decrypt, descramble, and/or otherwise process the received message (s) comprising the device attributes to extract the device attributes. The third network device(s) may store the device attributes to memory. Subsequently, the service provider $310_1$ may utilize the device attributes to determine which content, applications, and/or services to make available to a particular network device. In this regard, the service provider 3101 may be configured based on the attributes. Additionally and/or alternatively, the third network device may encode, format, or otherwise process content prior to transmission such that the content is customized for the device to which it is transmitted.

Figure 5:
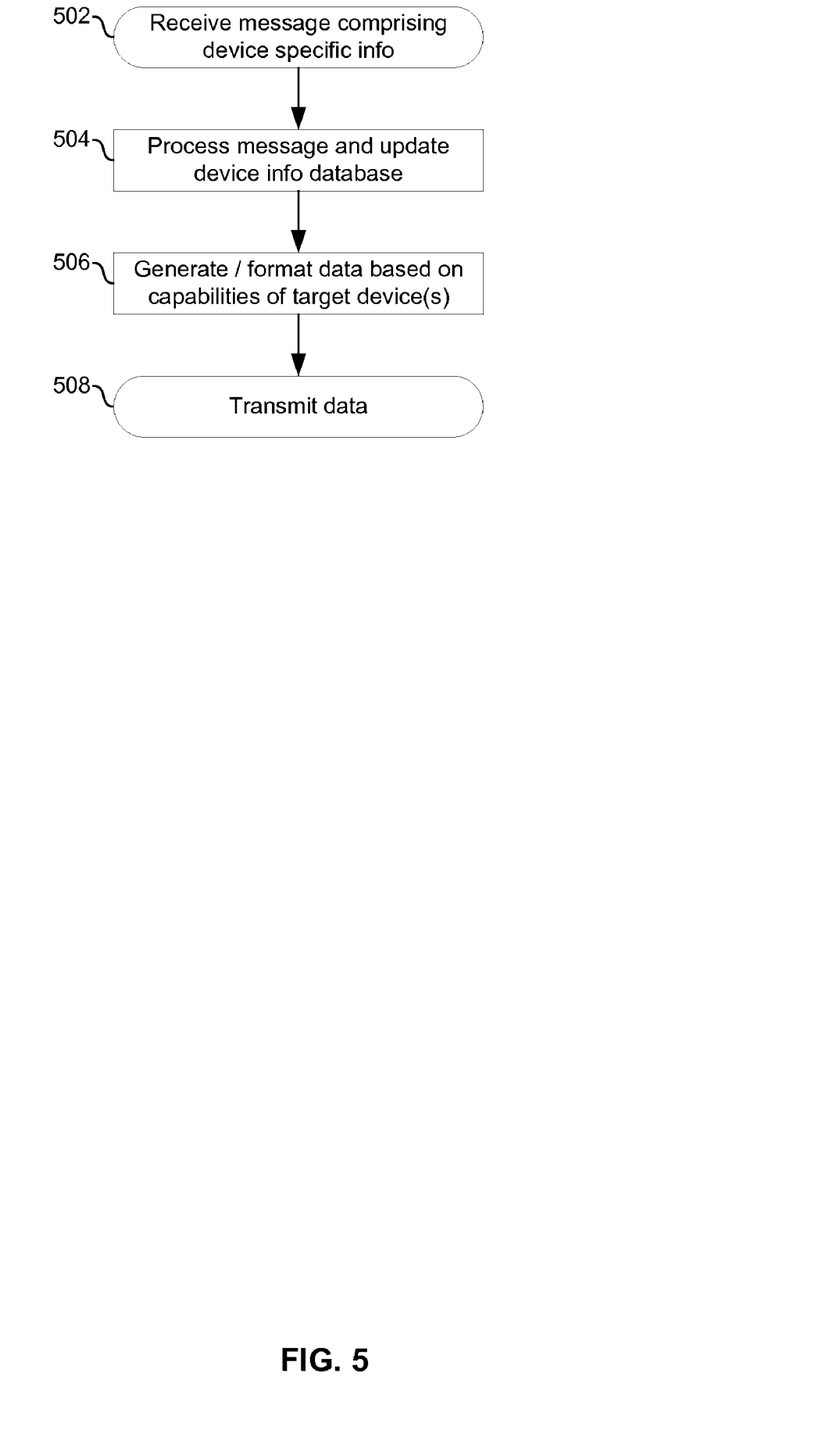
FIG. 5 is a flow chart illustrating delivery of customized data based on aggregated device attributes, in accordance with an embodiment of the invention.

FIG. 5 is a flow chart illustrating delivery of customized data based on aggregated device attributes, in accordance with an embodiment of the invention. Referring to FIG. 5, the exemplary steps may begin with step 502. In step 502, a service provider $310_1$ may receive one or more messages comprising device attributes. Subsequent to step 502, the exemplary steps may advance to step 504. In step 504, the service provider $310_1$ may decode, decrypt, and/or otherwise process the received message(s) comprising the device attributes to extract the device attributes. The service provider $310_1$ may store the device attributes to memory. In this regard, the service provider $310_1$ may comprise a database which may be updated upon received the device attributes. Subsequent to step 504, the exemplary steps may advance to step 506.

In step 506, the service provider $310_1$ may receive a request for content from a remote networking device and the service provider $310_1$ may prepare to transmit the content to the requesting device. In this regard, the service provider $310_1$ may look up the requesting device's attributes in the database and determine how to process the data such that the data may be customized based on exemplary factors comprising, the capabilities, attributes, and/or configuration of the requesting device. Subsequent to step 506, the exemplary steps may advance to step 508 and transmit the customized data.

Various aspects of a method and system for customized data delivery via device attributes aggregation are provided. In an exemplary embodiment of the invention, a first network device 116 may receive device attributes from a plurality of devices 114 that are communicatively coupled to the first network device 116. The first network device 116 may communicate the aggregate device attributes to a source network device, such as server 106 (FIG. 1) and/or a device of a service provider $310_1$. The first network device 116 customized from the source network device 106, wherein the customization is based on the aggregate device attributes. The first network device 116 may communicate the customized content to the plurality of devices 114. The first network device 116 may comprise one or more of a set-top box, a wired access point, and/or wireless access point. The device attributes of each of the plurality of network devices may comprise settings, capabilities, and/or user preferences. The device attributes of each of the plurality of network devices may comprise one or more of: a serial number or unique identifier, a manufacturer identifier, a model identifier, a hardware configuration, a software configuration, an operating system identifier, available and/or total memory, available and/or total processing cycles, security information, battery level, and/or power settings.

The communication of the aggregate device attributes may be secured utilizing IPSec and/or MACsec protocols. The device attributes may be received by the first network device 116 via an out-of-band channel. The device attributes may be received by the first network device 116 device via an optical communication link. The content may be customized by one or more of: compressing, decompressing, down-sampling, and/or up-sampling. The customized content may be delivered from the first network device 116 to the plurality of devices based on the aggregate device attributes. The first network device 116 may be configured based on the aggregate device attributes. The source network device 106 may be configured based on the aggregate device attributes. One or more network devices along a network path between the first network device 116 and the source network device 106 may be configured based on the aggregate device attributes.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for customized data delivery via device attributes aggregation.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   at a first network device in data communication with a plurality of second network devices, each respective second network device having respective data processing attributes, receiving from two or more second network devices of the plurality of second network devices respective messages, the respective messages including information about respective data processing attributes of a respective second network device;
   at the first network device, generating a message which includes information aggregating the information about the respective data processing attributes received from the two or more second network devices, the message comprising identification data identifying respective second network devices of the two or more network devices and data identifying the respective data processing attributes of the identified respective second network devices;
   communicating the message from the first network device to a source network device;
   subsequently, receiving at the first network device respective requests for respective multimedia content from the two or more second network devices;
   communicating one or more messages from the first network device to the source network device requesting delivery of the respective multimedia content;
   receiving at the first network device from the source network device a scalable coded datastream comprising a plurality of respective subset datastreams, the respective subset datastream formed by the source network device using the identification data identifying the respective second network devices and the data identifying the respective data processing attributes of the two or more second network devices; and
   communicating the respective subset datastreams to the two or more second network devices.

2. The method of claim 1 further comprising:
   at the first network device, storing the information about the respective data processing attributes received from the two or more second network devices; and
   selecting which of the respective subset datastreams to communicate to the two or more second network devices using the stored the information about the respective data processing attributes.

3. The method of claim 1 wherein said first network device comprises a set-top box, a wired access point, or a wireless access point.

4. The method of claim 1 wherein receiving from two or more second network devices respective messages including information about respective data processing attributes comprises receiving information about respective settings, capabilities, or user preferences of the two or more second network devices.

5. The method of claim 1 wherein receiving from two or more second network devices respective messages including information about respective data processing attributes comprises receiving information about a serial number or unique identifier, a manufacturer identifier, a model identifier, a hardware configuration, a software configuration, an operating system identifier, available and/or total memory, available and/or total processing cycles, security information, battery level, or power settings of the two or more second network devices.

6. The method of claim 1 wherein communicating the message from the second network device to a source network device comprises encrypting the message before communicating the message.

7. The method of claim 1 wherein receiving the respective messages comprises receiving the respective messages via a channel different from a channel used for communicating the respective subset datastreams to the two or more second network devices.

8. The method of claim 1 further comprising:
   at the first network device, identifying the respective data processing attributes of the respective second network devices; and configuring the first network device for communication of the respective subset datastreams to the two or more second network devices using the identified respective data processing attributes.

9. A method for a communication system, the method comprising:
at a first network device in data communication with a first plurality of local network devices, each respective local network device of the first plurality having respective data processing attributes, receiving from two or more local network devices of the first plurality of local network devices respective messages, the respective messages including information about respective data processing attributes of a respective local network device of the first plurality of local network devices;
at a second network device in data communication with a second plurality of local network devices, each respective local network device of the second plurality having respective data processing attributes, receiving from two or more local network devices of the second plurality of local network devices respective messages, the respective messages including information about respective data processing attributes of a respective local network device of the second plurality of local network devices;
at the first network device, generating a first message which includes identification information identifying respective local network devices of the first plurality and information aggregating the information about the respective data processing attributes received from respective local network devices of the two or more local network devices of the first plurality;
communicating the first message from the first network device to an intermediate network device;
at the second network device, generating a second message which includes identification information identifying respective local network devices of the second plurality and information aggregating the information about the respective data processing attributes received from respective local network devices of the two or more local network devices of the second plurality;
communicating the second message from the second network device to the intermediate network device;
at the intermediate network device, receiving the first message and the second message;
at the intermediate network device, processing the first message and the second message to extract the identification information identifying respective local network devices of the first plurality and the information about the respective data processing attributes of the respective local network devices received from the two or more local network devices of the first plurality and the identification information identifying respective local network devices of the second plurality and the information about the respective data processing attributes of the respective local network devices received from the two or more local network devices of the second plurality;
at the intermediate network device, generating a third message which includes information aggregating information about data processing attributes of the intermediate network device, the identification information identifying respective local network devices of the first plurality and the information about the respective data processing attributes of the respective local network devices received from the two or more local network devices of the first plurality and the identification information identifying respective local network devices of the second plurality and the information about the respective data processing attributes of the respective local network devices received from the two or more local network devices of the second plurality; and
communicating the third message from the intermediate network device to a source network device.

10. The method of claim 9 further comprising:
at the intermediate network device, receiving content for the two or more local network devices of the first plurality and for the two or more local network devices of the second plurality from the source network device, the content customized for each respective local network device according to the information about the respective data processing attributes of the respective local network devices; and
communicating the received content to one of the first network device and the second network device for communication to a destination local network device.

11. The method of claim 10 wherein receiving content comprises:
receiving a multimedia data file which is compressed, decompressed, down-sampled or up-sampled relative to a source multimedia data file according to the information about the respective data processing attributes of a respective local network device; and
communicating the received multimedia data file to one of the first network device and the second network device for communication to the respective local network device.

12. The method of claim 9 further comprising:
at the intermediate network device, identifying the respective data processing attributes of respective local network devices; and
configuring the intermediate network device for communication of the received content to the respective second network devices using the identified respective data processing attributes.

13. An access point for access to a communication network, the access point comprising:
a memory;
a local communication circuit for communication with local devices;
a network communication circuit for communication with a remote data source;
a processor in data communication with the memory, the local communication circuit and the network communication circuit, the processor operable to
receive through the local communication circuit respective device attribute messages from respective local devices, the respective device attribute messages including a first data field containing identification data identifying the respective local devices and a second data field containing data defining respective multimedia processing attributes of the respective local devices;
aggregate the respective multimedia processing attributes in a message, the message including a first data field aggregating the identification data of the respective local devices and a second data field aggregating the data defining the respective multimedia processing attributes of the respective local devices;
communicate the message to the remote data source via the network communication circuit;
receive from the remote data source via the network communication circuit combined content data, the combined content data including respective content for respective local devices, each respective content being customized for use by the respective local device using the identification data of the respective local devices and the data defining the respective multimedia processing attributes of the respective local devices; and communicate, via the local communication circuit, each respective content to each respective local device.

14. The access point of claim 13 wherein the access point comprises a router.

15. The access point of claim 13 wherein the memory is configured to store the respective multimedia processing attributes of the respective local devices.

16. The access point of claim 15 wherein the processor is operable to configure the access point using the respective multimedia processing attributes of the respective local devices.

17. The access point of claim 15 wherein the local communication circuit is operable to communicate respective content to a respective local device using a respective multimedia processing attribute of the respective local device.

18. The access point of claim 13 wherein the respective content is customized by one or more of: compressing, decompressing, down-sampling, and/or up-sampling according to the respective multimedia processing attributes of respective local devices to which the respective content is communicated.

19. The access point of claim 13 wherein the local communication circuit comprises:

a first communication channel for communicating the respective device attribute messages from each respective local device; and a second communication channel for communicating respective content to each respective local device.

20. The access point of claim 13 wherein the respective multimedia processing attributes of respective local devices comprise settings, capabilities, or user preferences for the respective local devices.

* * * * *